(12) United States Patent
Wand

(10) Patent No.: US 11,590,860 B2
(45) Date of Patent: Feb. 28, 2023

(54) MICROCONTROLLER DUAL INPUT BOOT ASSIST CONTROL CIRCUIT

(71) Applicant: Ford Global Technologies, LLC, Dearborn, MI (US)

(72) Inventor: Thomas Joseph Wand, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 333 days.

(21) Appl. No.: 16/877,170

(22) Filed: May 18, 2020

(65) Prior Publication Data

US 2021/0354589 A1   Nov. 18, 2021

(51) Int. Cl.
*G06F 1/24* (2006.01)
*B60L 58/18* (2019.01)
*H02J 7/00* (2006.01)
*G06F 21/57* (2013.01)

(52) U.S. Cl.
CPC .............. *B60L 58/18* (2019.02); *G06F 1/24* (2013.01); *G06F 21/575* (2013.01); *H02J 7/0047* (2013.01)

(58) Field of Classification Search
CPC .......... B60L 58/18; G06F 1/24; G06F 21/575; H02J 7/0047
See application file for complete search history.

(56) References Cited

U.S. PATENT DOCUMENTS

| 6,107,835 A * | 8/2000 | Blomgren ............... G06F 30/30 326/98 |
| 6,424,211 B1 * | 7/2002 | Nolan ................. H03F 3/45771 330/9 |
| 10,601,614 B1 * | 3/2020 | Liu ........................ H04L 25/069 |
| 2002/0091951 A1 * | 7/2002 | Jaeger ..................... H04L 12/10 713/300 |
| 2012/0013362 A1 * | 1/2012 | Hirose ........... H03K 19/018521 326/81 |

(Continued)

OTHER PUBLICATIONS

"MPC5644A Microcontroller Data Sheet", Freescale Semiconductor Data Sheet Advance Information, Document No. MPC5644A, Rev. 7, Jan. 2012, pp. 1-138.

(Continued)

*Primary Examiner* — Zahid Choudhury
(74) *Attorney, Agent, or Firm* — David B. Kelley; Brooks Kushman P.C.

(57) ABSTRACT

An automotive control module includes a microcontroller having an access port, and that permits reprogramming of its functions responsive to a voltage at the access port being greater than a first predefined threshold upon power-up or reset thereof. The automotive control module also includes a boot assist control circuit lacking logical elements and including a pair of input ports, an output port directly electrically connected to the access port, and a plurality of capacitors, resistors, and transistors electrically connected between the pair and output port. The plurality outputs a voltage to the output port at least equal to the first predefined threshold responsive to voltages at both the input ports being greater than a second predefined threshold, and outputs a voltage to the output port less than the first predefined threshold responsive to the voltage at either one of the input ports being less than the second predefined threshold.

13 Claims, 3 Drawing Sheets

(56) References Cited

U.S. PATENT DOCUMENTS

| | | | |
|---|---|---|---|
| 2013/0093487 A1* | 4/2013 | Rzehak | G06F 1/24 |
| | | | 327/198 |
| 2013/0134985 A1* | 5/2013 | Bernardon | G01R 31/52 |
| | | | 324/527 |
| 2020/0042028 A1* | 2/2020 | Deval | G05F 1/59 |
| 2020/0125519 A1* | 4/2020 | Pan | G06F 13/4022 |
| 2021/0099086 A1* | 4/2021 | Brenguier | H02M 7/219 |
| 2021/0126528 A1* | 4/2021 | King | H02M 3/1584 |

OTHER PUBLICATIONS

Jamaal Fraser, "MPC574xP Hardware Design Guide", Freescale Semiconductor, Inc., Application Notes, Document No. AN5267, Mar. 2016, pp. 1-34.

* cited by examiner

MICROCONTROLLER DUAL INPUT BOOT ASSIST CONTROL CIRCUIT

TECHNICAL FIELD

This application relates to automotive electronic components.

BACKGROUND

Electrified vehicles (EVs) including hybrid-electric vehicles (HEVs) and battery electric vehicles (BEVs) rely on a traction battery to provide power to a traction motor for propulsion and a power inverter therebetween to convert direct current (DC) power to alternating current (AC) power. The typical AC traction motor is a 3-phase motor that may be powered by 3 sinusoidal signals each driven with 120 degrees phase separation. The traction battery is configured to operate in a particular voltage range and provide a maximum current.

Certain electrified vehicles include a DC-DC converter, also referred to as a variable voltage converter (VVC), to convert the voltage of the traction battery to an operational voltage level of the electric machine. The electric machine, that may include a traction motor and a generator, may require high voltage and high current. Due to the voltage and current requirements, a battery module and a power electronics module are typically in continuous communication.

SUMMARY

An automotive control module includes a microcontroller including an access port. The microcontroller permits reprogramming of functions of the microcontroller responsive to a voltage at the access port being greater than a first predefined threshold upon power-up or reset of the microcontroller, prevents reprogramming of the functions responsive to the voltage being less than the first predefined threshold upon power-up or reset of the microcontroller, and prevents reprogramming of the functions after power-up or reset of the microcontroller. The automotive control module also includes a boot assist control circuit lacking logical elements and including a pair of input ports, an output port directly electrically connected to the access port, and a plurality of capacitors, resistors, and transistors electrically connected between the pair and output port. The plurality outputs a voltage to the output port at least equal to the first predefined threshold responsive to voltages at both the input ports being greater than a second predefined threshold, and outputs a voltage to the output port less than the first predefined threshold responsive to the voltage at either one of the input ports being less than the second predefined threshold.

An automotive vehicle includes a traction battery, an electric machine that receives power from the traction battery, and a control module. The control module monitors cells of the traction battery, and includes a microcontroller and a boot assist control circuit. The microcontroller includes an access port and permits reprogramming of functions of the microcontroller responsive to a voltage at the access port being greater than a first predefined threshold upon power-up or reset of the microcontroller. The boot assist control circuit lacks logical elements and includes a pair of input ports, an output port directly electrically connected to the access port, and a plurality of capacitors, resistors, and transistors electrically connected between the pair and output port. The plurality outputs a voltage to the output port at least equal to the first predefined threshold responsive to voltages at both the input ports being greater than a second predefined threshold, and outputs a voltage to the output port less than the first predefined threshold responsive to the voltage at either one of the input ports being less than the second predefined threshold.

A boot assist control circuit includes a pair of input ports, an output port, and a plurality of capacitors, resistors, and transistors electrically connected between the pair and output port. The plurality, in an absence of logical elements, outputs a voltage to the output port at least equal to a first predefined threshold responsive to voltages at both the input ports being greater than a second predefined threshold, and outputs a voltage to the output port less than the first predefined threshold responsive to the voltage at either one of the input ports being less than the second predefined threshold.

DETAILED DESCRIPTION

Figure 1:
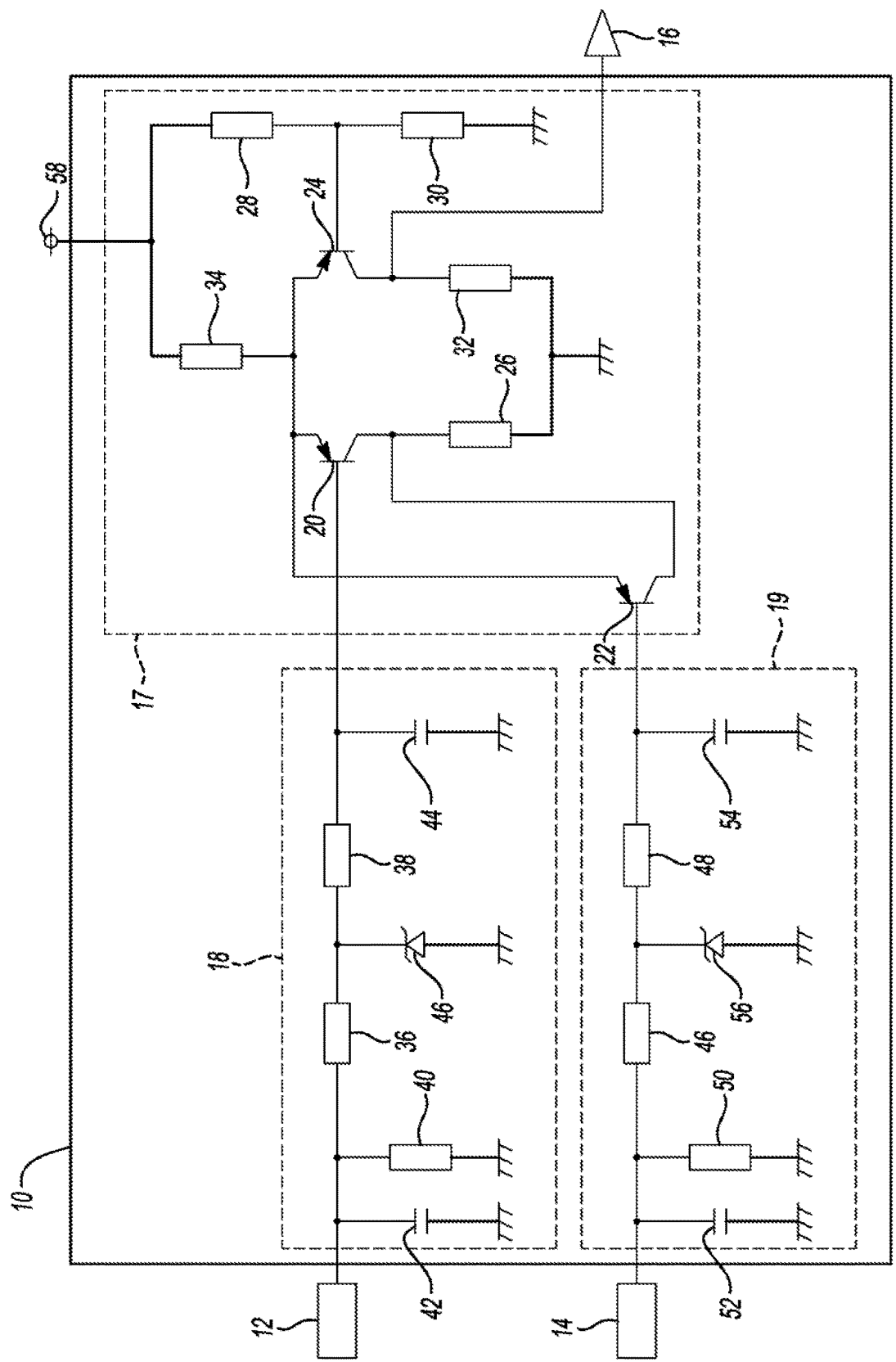
FIG. 1 is a schematic diagram of boot assist control circuitry.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Within modern vehicle electronic modules there resides at the heart of the module a microcontroller integrated circuit. This highly integrated circuit may have within it a microprocessor, memory, a state machine to control functions, and any number of input or output circuit functions. The entire module function may be based on software code that is written and contained within the memory.

These powerful, highly integrated, software driven modules have many presets to configure the microcontroller as needed for a particular function. As such, these microcontrollers may be susceptible to being corrupted either accidentally or purposefully by modifying the device presets or software itself. Therefore, protections are included to aid in preventing these corruptions. One of the protections is a specific pin (access port) of the integrated circuit that logically channels the microcontroller into normal operation or into a specific programing mode. This mode is referred to as the Boot Assist Module (BAM). The microcontroller responds to the logic level of this pin (BAM pin) upon reset or power-up reset. Because the microcontroller checks this pin upon reset, the pin setting should be stable at the desired level immediately. To facilitate versatility, a means of controlling this pin externally to the module is desirable.

Controlling the BAM pin of the microcontroller from an external source may add some requirements, such as isolating the external connection from the microcontroller, shielding the BAM pin from electrical static discharge and electromagnetic compatibility issues, providing the ability to have the pin logical state set immediately upon power-up, and providing a method of controlling the BAM pin such that, for example, a short or open circuit could not cause an improper start up.

Providing the ability to have the pin logical state set immediately upon power-up may be necessary because the microcontroller checks the pin level as soon as the microcontroller is awake and operating, and this happens during the initial reset function. Any power supply used should be stabilized before, or in line with, the microcontroller power source.

At least some of the above objectives can met by designing a BAM circuit that uses two external connections that both agree to set the boot assist mode, which provides for reprogramming (anything other than both connections matching the request will remain in normal operating mode). The BAM circuit may use a passive resistor pull down to ensure the BAM pin is high unless requested to program. Additionally, the BAM circuit may require the microcontroller to activate in its setup an internal pull up/down. This may be helpful in identifying the response should the solder connection to this pin become open circuited. The BAM circuit does not use active logic devices, analogue devices, or other means of logically controlling the pin. This is done because those components often require a power supply to run them, introduce time to stabilize the circuit, create other issues (e.g. bond wire issues, silicon issues, etc.), add cost, and occupy board space.

For simplicity, certain implementations of the BAM circuit may use bipolar transistors, though field effect transistors can be used in similar fashion. The circuitry may also include a differential amplifier forming a current mirror, and two transistors connected in parallel to form two independent input connections for isolation and fault tolerance. Alternatively, the circuitry may include a transistor and two diodes arranged to form diode transistor logic for the two external connections. Other topologies are also contemplated.

With reference to FIG. 1, an example BAM circuit 10 includes two, parallel inputs 12, 14 (input ports), and an output 16 (output port). The BAM circuit 10 also defines a switch portion 18, and lines 20, 22 electrically connecting the switch portion 18 and inputs 12, 14 respectively.

The switch portion includes transistors 20, 22, 24, and resistors 26, 28, 30, 32, 34. The resistors 28 and 30 set up a voltage divider to set the threshold for the inputs to define when they will trip the input. Running, for example, on a power source 58 (e.g., a 5 Volts), the resistors 28, 30 will provide a threshold voltage of approximately 0.75 times the supply (e.g., 3.8 Volts). The base current may offset this and for this discussion, it will be negated.

The resistor 32 provides a current limit for the transistors 20, 22 and has an effect on rate of transition for switching. The resistor 32 thus provides a current limit for the saturated state of the transistor 24, and also sets the BAM circuit output impedance and a pull down on a low level to the output 16. At, for example, a 20K Ohm resistance, the impedance is low enough and the current high enough for the output to function quickly and reliably.

The line 20 includes resistors 36, 38, 40, capacitors 42, 44, and Zener diode 46. The resistors 36, 38 are connected in series electrically between the input 12 and transistor 20. The resistor 40 is connected electrically between the input 12 and resistor 36, and ground. Likewise, the capacitor 42 is connected electrically between the input 12 and resistor 36, and ground. The capacitor 44 is connected between the transistor 20 and resistor 38, and ground. The Zener diode 46 is connected between the resistors 36, 38, and ground.

The resistor 40 serves as an input load, input quieting to ground, and as a current source to a base of the transistor 20. The resistors 36, 38 serve as current limiters to the transistor 20. Additionally, the resistor 36 serves as a current limit to the Zener diode 46, which clamps the voltage available to the transistor 20 within the device tolerances over the full temperature range. The capacitor 42 serves as an electrostatic discharge and electromagnetic interference shield to/from the external connection to the input 12. The capacitor 44 serves as a filter cap to roll off any AC signal that may come in on the input 12.

The line 22 includes resistors 46, 48, 50, capacitors 52, 54, and Zener diode 56. The resistors 46, 48 are connected in series electrically between the input 14 and transistor 22. The resistor 50 is connected electrically between the input 14 and resistor 46, and ground. Likewise, the capacitor 52 is connected electrically between the input 14 and resistor 46, and ground. The capacitor 54 is connected between the transistor 22 and resistor 48, and ground. The Zener diode 56 is connected between the resistors 46, 48, and ground.

The resistor 50 serves as an input load, input quieting to ground, and as a current source to a base of the transistor 22. The resistors 46, 48 serve as current limiters to the transistor 22. Additionally, the resistor 46 serves as a current limit to the Zener diode 56, which clamps the voltage available to the transistor 22 within the device tolerances over the full temperature range. The capacitor 52 serves as an electrostatic discharge and electromagnetic interference shield to/from the external connection to the input 14. The capacitor 54 serves as a filter cap to roll off any AC signal that may come in on the input 14.

As mentioned above with regard to the input 12, the resistor pulls the input 12 normally low, the Zener diode 46 clips the voltage from the input 12 (to for example 5.6 Volts), and the capacitor 44 filters noise. When the input 12 is low, the base of the transistor 20 is pulled low, putting it in saturation mode. The resistors 26 and 34 effectively act as a voltage divider of the logical power source 58, and the voltage drop at the resistor 34 becomes great enough such that the voltage at the emitter of the transistor 24 is less than the voltage at the base of the transistor 24, which forces the transistor 24 off. Therefore, the output 16 only sees the resistor 32 to ground. That is, the output is pulled low regardless of whether the input 14 is high.

The resistor pulls the input 14 normally low, the Zener diode 56 clips the voltage from the input 14, and the capacitor 54 filters noise. When the input 14 is low, the base of the transistor 22 is pulled low, putting it in saturation mode. The resistors 26 and 34 effectively act as a voltage divider of the logical power source 58, and the voltage drop at the resistor 34 becomes great enough such that the voltage at the emitter of the transistor 24 is less than the voltage at the base of the transistor 24, which forces the transistor 24 off. Therefore, the output 16 only sees the resistor 32 to ground. That is, the output is pulled low regardless of whether the input 12 is high.

If the input 12 is high, the transistor 20 will turn off because the voltage at the base of the transistor 20 will be greater than the voltage at the emitter of the transistor 20. And if the input 14 is also high, the transistor 22 will turn off for similar reasons. As such, the only current through the resistor 34 is that which is being pulled by the transistor 24, which will put the transistor 24 in saturation mode, and the output 16 will be pulled high.

Figure 2:
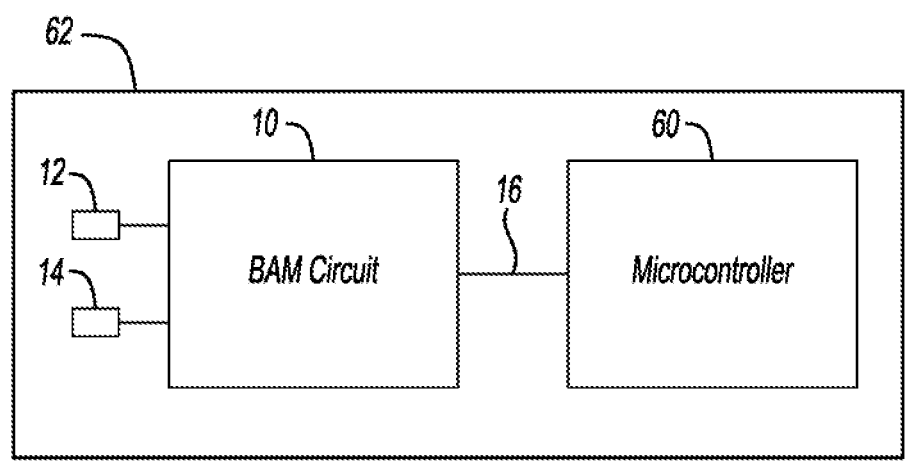
FIG. 2 is a block diagram of a portion of a control module.

With reference to FIG. 2, the BAM circuit 10 is connected to a microcontroller 60 via the output 16, which are both contained within a larger control module 62 (e.g., a body electrical control module, a battery energy control module, etc.). The microcontroller 60 has a boot controller that handles programmed boot up activities such as the setting of timers, configurations, etc. The boot controller is inaccessible unless the output 16 is high. Timers, for example, cannot be reprogrammed unless the output 16 is high during power-up or reset of the microcontroller 60. To make the output 16 high, both the inputs 12, 14 need to be high.

Figure 3:
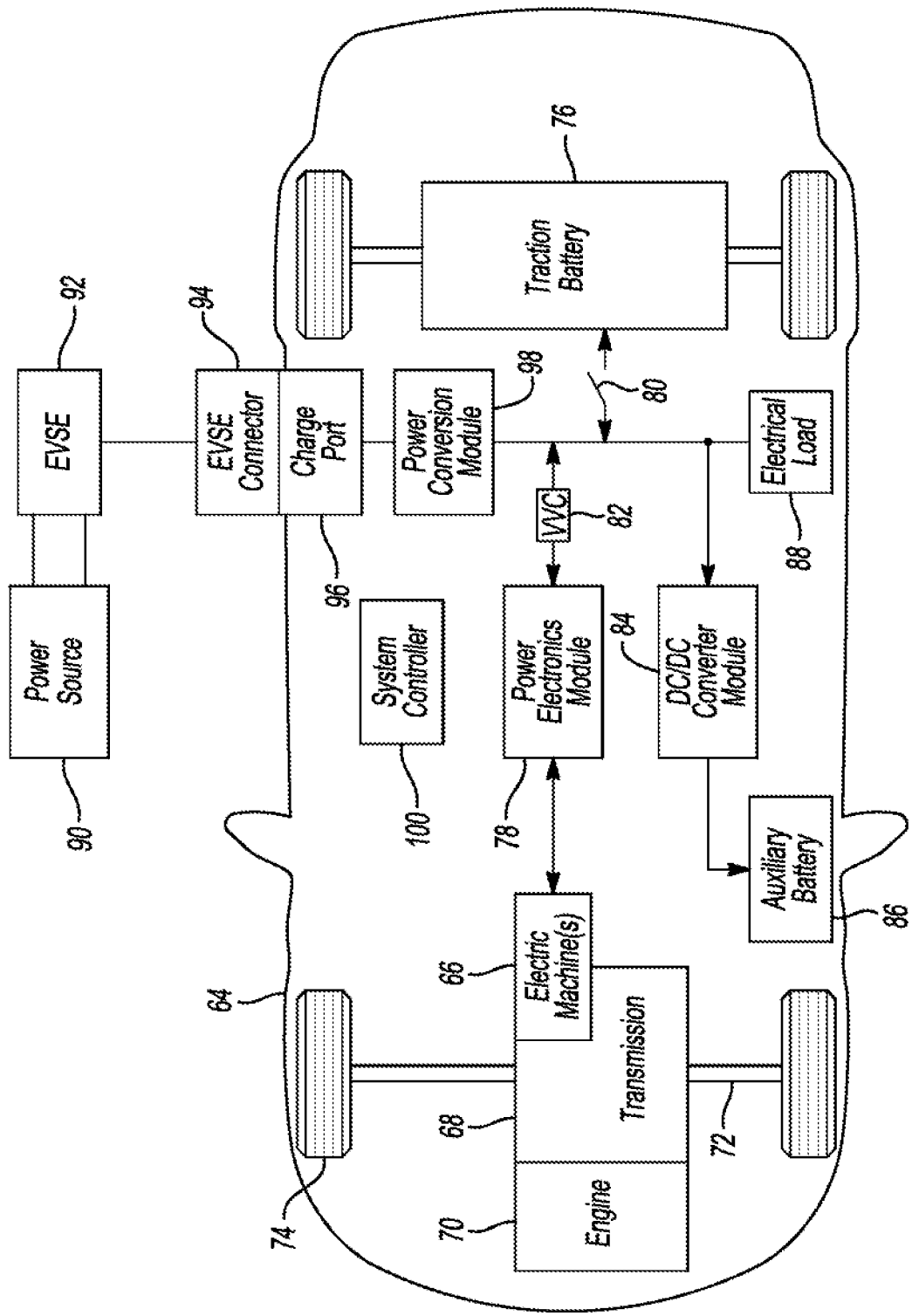
FIG. 3 is a block diagram of an automotive vehicle.

The control module 62 may be used within a vehicle. FIG. 3 depicts an example of such a vehicle 64 that may be referred to as a plug-in hybrid-electric vehicle (PHEV). It may include one or more electric machines 66 mechanically coupled to a hybrid transmission 68. The electric machines 66 may be capable of operating as a motor or a generator. In addition, the hybrid transmission 68 is mechanically coupled to an engine 70. The hybrid transmission 68 is also mechanically coupled to a drive shaft 72 that is mechanically coupled to the wheels 74. The electric machines 66 can provide propulsion and deceleration capability when the engine 70 is turned on or off. The electric machines 66 may also act as generators and can provide fuel economy benefits by recovering energy that would normally be lost as heat in a friction braking system. The electric machines 66 may also reduce vehicle emissions by allowing the engine 70 to operate at more efficient speeds and allowing the hybrid-electric vehicle 64 to be operated in electric mode with the engine 70 off under certain conditions. Other example vehicles include a battery electric vehicle (BEV) and a full hybrid-electric vehicle (FHEV) without plug-in capability, etc.

A traction battery or battery pack 76 stores energy that can be used by the electric machines 66. The vehicle battery pack 76 may provide a high-voltage direct current (DC) output. The traction battery 76, which may include the control module 62, may be electrically coupled to one or more power electronics modules 78, which may alternatively include the control module 62. In examples in which the control module resides within the traction battery 76, it may monitor the current, voltage, and/or temperature of cells of the traction battery 76, as well as perform other functions. One or more contactors 80 may isolate the traction battery 76 from other components when opened and connect the traction battery 76 to other components when closed. The power electronics module 78 is also electrically coupled to the electric machines 66 and provides the ability to bi-directionally transfer energy between the traction battery 76 and electric machines 66. For example, the traction battery 76 may provide a DC voltage while the electric machines 66 may operate with a three-phase alternating current (AC) to function. The power electronics module 78 may convert the DC voltage to a three-phase AC current to operate the electric machines 66. In a regenerative mode, the power electronics module 78 may convert the three-phase AC current from the electric machines 66 acting as generators to the DC voltage compatible with the traction battery 76.

The vehicle 64 may include a variable-voltage converter (VVC) 82 electrically coupled between the traction battery 76 and the power electronics module 78. The VVC 82 may be a DC/DC boost converter configured to increase or boost the voltage provided by the traction battery 76. By increasing the voltage, current requirements may be decreased leading to a reduction in wiring size for the power electronics module 78 and the electric machines 66. Further, the electric machines 66 may be operated with better efficiency and lower losses.

In addition to providing energy for propulsion, the traction battery 76 may provide energy for other vehicle electrical systems. The vehicle 64 may include a DC/DC converter module 84 that converts the high-voltage DC output of the traction battery 76 to a low voltage DC supply that is compatible with low-voltage vehicle loads. An output of the DC/DC converter module 84 may be electrically coupled to an auxiliary battery 86 (e.g., 12V battery) for charging the auxiliary battery 86. The low-voltage systems may be electrically coupled to the auxiliary battery 86. One or more electrical loads 88 may be coupled to the high-voltage bus. The electrical loads 88 may have an associated controller, that may include a control module similar to the control module 62, and that operates and controls the electrical loads 88 when appropriate. Examples of electrical loads 88 may be a fan, an electric heating element and/or an air-conditioning compressor.

The electrified vehicle 64 may be configured to recharge the traction battery 76 from an external power source 90. The external power source 90 may be a connection to an electrical outlet. The external power source 90 may be electrically coupled to a charger or electric vehicle supply equipment (EVSE) 92. The external power source 90 may be an electrical power distribution network or grid as provided by an electric utility company. The EVSE 92 may provide circuitry and controls to regulate and manage the transfer of energy between the power source 90 and the vehicle 64. The external power source 90 may provide DC or AC electric power to the EVSE 92. The EVSE 92 may have a charge connector 94 for plugging into a charge port 96 of the vehicle 64. The charge port 96 may be any type of port configured to transfer power from the EVSE 94 to the vehicle 64. The charge port 96 may be electrically coupled to a charger or on-board power conversion module 98. The power conversion module 98 may condition the power supplied from the EVSE 94 to provide the proper voltage and current levels to the traction battery 76. The power conversion module 78 may interface with the EVSE 94 to coordinate the delivery of power to the vehicle 64. The EVSE connector 94 may have pins that mate with corresponding recesses of the charge port 96. Alternatively, various components described as being electrically coupled or connected may transfer power using a wireless inductive coupling.

Electronic modules in the vehicle 64 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 86. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown but it may be implied that the vehicle network may connect to any electronic module that is present in the vehicle 64. A vehicle system controller (VSC) 100, which may alternatively include the control module 62, may be present to coordinate the operation of the various components.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The schematic connections between the elements of FIG. 1, for example, may be facilitated by way of a network. And although PNP transistors are shown in FIG. 1, NPN transistors may also be suitably arranged, etc.

The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive control module comprising:
 a microcontroller including an access port, the microcontroller being configured to
  permit reprogramming of functions of the microcontroller responsive to a voltage at the access port being greater than a first predefined threshold upon power-up or reset of the microcontroller,
  prevent reprogramming of the functions responsive to the voltage being less than the first predefined threshold upon power-up or reset of the microcontroller, and
  prevent reprogramming of the functions after power-up or reset of the microcontroller; and
 a boot assist control circuit including a pair of input ports, an output port directly electrically connected to the access port, and a plurality of capacitors, resistors, and transistors electrically connected between the pair and output port, wherein the plurality is configured to
  output a voltage to the output port at least equal to the first predefined threshold responsive to voltages at both the input ports being greater than a second predefined threshold, and
  output a voltage to the output port less than the first predefined threshold responsive to the voltage at either one of the input ports being less than the second predefined threshold.

2. The automotive control module of claim 1, wherein each of the input ports is electrically connected with a base of a respective one of the transistors.

3. The automotive control module of claim 2 further comprising a power source electrically connected with emitters of the transistors.

4. The automotive control module of claim 2, wherein the plurality further includes Zener diodes configured to clamp voltages available at the bases to a predefined limit value.

5. The automotive control module of claim 1, wherein the transistors are bipolar junction transistors or field effect transistors.

6. The automotive control module of claim 1, wherein a collector of one of the transistors is directly electrically connected with the output port.

7. An automotive vehicle comprising:
 a traction battery;
 an electric machine configured to receive power from the traction battery; and
 a control module configured to monitor cells of the traction battery, and including a microcontroller and a boot assist control circuit, wherein the microcontroller includes an access port and is configured to permit reprogramming of functions of the microcontroller responsive to a voltage at the access port being greater than a first predefined threshold upon power-up or reset of the microcontroller, wherein the boot assist control circuit lacks logical elements and includes a pair of input ports, an output port directly electrically connected to the access port, and a plurality of capacitors, resistors, and transistors electrically connected between the pair and output port, and wherein the plurality is configured to (i) output a voltage to the output port at least equal to the first predefined threshold responsive to voltages at both the input ports being greater than a second predefined threshold and (ii) output a voltage to the output port less than the first predefined threshold responsive to the voltage at either one of the input ports being less than the second predefined threshold.

8. The automotive vehicle of claim 7, wherein each of the input ports is electrically connected with a base of a respective one of the transistors.

9. The automotive vehicle of claim 8 further comprising a power source electrically connected with emitters of the transistors.

10. The automotive vehicle of claim 8, wherein the plurality further includes Zener diodes configured to clamp voltages available at the bases to a predefined limit value.

11. The automotive vehicle of claim 7, wherein the transistors are bipolar junction transistors or field effect transistors.

12. The automotive vehicle of claim 7, wherein a collector of one of the transistors is directly electrically connected with the output port.

13. The automotive vehicle of claim 7, wherein the microcontroller is further configured to prevent reprogramming of the functions responsive to the voltage being less than the first predefined threshold upon power-up or reset of the microcontroller.

* * * * *